(12) United States Patent
Betz et al.

(10) Patent No.: US 7,472,008 B2
(45) Date of Patent: Dec. 30, 2008

(54) SYSTEMS AND METHODS FOR CONTROLLING MOBILE MACHINE POWER

(75) Inventors: Michael Donald Betz, Knoxville, IL (US); Stephen Carl Garnett, Princeville, IL (US); Chih Chieh Liang, Peoria, IL (US); Michael George Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 867 days.

(21) Appl. No.: 10/897,109

(22) Filed: Jul. 23, 2004

(65) Prior Publication Data

US 2006/0020383 A1    Jan. 26, 2006

(51) Int. Cl.
*G06F 19/00* (2006.01)
(52) U.S. Cl. .......................................... 701/50; 701/93
(58) Field of Classification Search ................... 701/50, 701/93, 55; 477/30, 34, 42–43; 192/103 R
See application file for complete search history.

(56) References Cited

U.S. PATENT DOCUMENTS 4,109,772 A * 8/1978 Poore ........................... 477/31
4,998,591 A 3/1991 Zaunberger
6,253,143 B1 * 6/2001 Silvernagle et al. ........... 701/93
6,434,466 B1 8/2002 Robichaux et al.
6,438,506 B1 8/2002 Yohpe et al.
6,470,985 B1 10/2002 Inada et al.
6,772,060 B2 * 8/2004 McCauley et al. .......... 701/104
7,082,361 B2 * 7/2006 Berger et al. .................. 701/93
2002/0123836 A1 9/2002 Komiyama et al.

FOREIGN PATENT DOCUMENTS

EP    0 267 990    11/1986
EP    0 781 680    7/1997

* cited by examiner

*Primary Examiner*—Yonel Beaulieu
(74) *Attorney, Agent, or Firm*—Finnegan, Henderson, Farabow, Garrett & Dunner

(57) ABSTRACT

A method is provided for controlling power provided by a drive train system of a mobile machine, which includes an engine that provides engine power to a generator that, in turn, provides generator power to a motor. The motor provides ground power to a travel mechanism that enables the mobile machine to travel across a terrain surface. In one embodiment, the method includes adjusting operation of the motor based on a determined ground speed of the mobile machine. Based on the adjusted motor operations, the operation of the generator is adjusted. Also, the operation of the engine is adjusted such that the engine produces an amount of engine power that meets a load demand corresponding to the adjusted operation of the generator.

33 Claims, 8 Drawing Sheets

SYSTEMS AND METHODS FOR CONTROLLING MOBILE MACHINE POWER

TECHNICAL FIELD

This invention relates generally to work machine power control systems and more particularly, to systems and methods for shaping power curves in a work machine based on ground speed.

BACKGROUND

The ability to control power is an important feature in modern work machines (e.g., fixed and mobile commercial machines, such as construction machines, fixed engine systems, marine-based machines, etc.). Today, modern machines control power through one or more control units, such as an Engine Control Unit (ECU). This unit includes hardware, software, and/or firmware that is used to manage various machine operations. For example, ECUs may be configured to control ignition and/or fuel injection operations to regulate power provided by the machine's engine.

An ECU performs these control functions by executing one or more programs stored in an internal memory. Typically, these programs include logic that produces one or more output values used as control signals by various components of a host machine. The program logic may access one or more performance maps to determine data values to produce the output values. A performance map is a data relationship between one or more control variables associated with operations of the host vehicle, such as ignition timing, engine RPM, etc. Each map may include one or more data values for each of many different operating conditions. For example, a performance map may include a relationship of data values (e.g., a mathematical function and corresponding data array) from which the program logic may obtain data values to produce an output signal.

Because ECUs may be implemented in different types of machines, a particular ECU may include several different performance maps corresponding to varying load conditions that may be experienced by the machine. Further, because machine applications and conditions vary, the performance maps may include different data values for customizing the machine's performance. Accordingly, modern machines may control power provided to a machine's drive train. Typically, however, these machines control machine power based on the speed of the engine, which has a direct affect on power losses due to, for instance, dissipated heat.

To illustrate these problems, FIG. 1 shows a graph of exemplary power curves associated with a conventional work machine. Curve 110 represents the power provided to the drive train by an engine of a conventional torque converter work machine in a first forward gear. Curve 115 represents the power provided by the drive train (torque converter output) in first forward gear to mechanisms used by the machine to travel on the ground, such as the power provided to the sprockets of a track type tractor work machine. Thus, curve 115 represent power that corresponds to the power provided to the work machine's drive train, as illustrated by curve 110. Similarly, curve 120 represents the power provided to the drive train in a second forward gear. Curve 125 represents the corresponding ground power provided by the machine's drive train based on the input power of curve 120. Curve 130 represents the power provided to the drive train in a third forward gear. And, curve 135 represents the corresponding power provided by the drive train based on the input power reflected by curve 130.

As shown, the power provided to the drive train in each of the three exemplary gears reaches maximum limits at certain ground speeds. For example, in first gear, the machine's engine produces high power at very low ground speeds and tapers after the machine reaches a certain speed (e.g., 1.5 mph). Also, the power produced by the machine's drive train follows pseudo-parabolic curves that reach peak levels based on the ground speed of the machine (e.g., "H" hp at 1.5 mph in first gear). As can be seen, the power loss at low speeds is very high due to the nature of a torque converter machine.

The typical working speed of a particular type of work machine also affects the power operations of the work machine. For example, if the typical working speed of a track type tractor work machine moving forward is 1.5 to 3.5 mph, the work machine would have to operate between first and second forward gears. The drive train power shown in FIG. 1; curves 115, 125, and 135 peaks at about "H" hp and then drops off, respectively. In this example, a constant drive train power of "H" hp would be ideal for this type of exemplary work machine. However, such operations are not feasible in machines that use gears and torque converters/dividers because of the significant power losses associated with operation of these components.

One typical machine designed to control a drive train is described in U.S. Pat. No. 6,434,466 ("the '466 patent"). The machine described in the '466 patent uses a transmission that transfers power produced by an engine to mechanisms that move the machine. The machine controls a drive train based on a plurality of information collected and determined by the machine. This information includes a desired wheel torque, engine speed, turbine speed, a selected gear and associated selected gear ratio, a transmission spin loss based on a first function of the turbine speed and the selected gear, a transmission torque proportional loss based on a second function of the turbine speed and the selected gear, a desired engine torque based on the transmission spin loss, the transmission torque proportional loss, and the selected gear ratio. Using this information, the drive train may control the actual wheel torque such that it approaches the desired wheel torque determined by the machine. Further, the '466 patent may use ground speed as an event threshold value that controls which method the vehicle may use to determine engine torque. For instance, the '466 patent determines engine torque using a power-based calculation if vehicle speed is above a predetermined threshold, and a gear ratio-based calculation if vehicle speed does not exceed the predetermined threshold.

Although modern machines, such as the one described in the '466 patent, have the ability to control a drive train based on the parameters associated with one or more machine components, they still experience power losses because of the machine transmission's dependency on engine speed. For example, at low ground speeds, a machine may experience significant power losses due to, for example, heat dissipated from the engine that is running at unnecessarily high speeds. Thus, the machine wastes power at these ground speeds because the machine is not moving, or moving very slow, while the engine is running at relatively high rpm. Also, there are no mechanisms in these machines to allow for ground travel control independent of engine machine operation.

Methods, systems, and articles of manufacture consistent with certain embodiments of the present invention are directed to solving one or more of the problems set forth above.

SUMMARY OF THE INVENTION

A method is provided for controlling power provided by a drive train system of a work machine, which includes an engine that provides engine power to a generator that, in turn, provides generator power to a motor. The motor provides power to a travel mechanism that enables the work machine to travel across a terrain surface. In one embodiment, the method includes adjusting operation of the motor based on a determined ground speed of the work machine. Based on the adjusted motor operations, the operation of the generator is adjusted. Also, the operation of the engine is adjusted such that the engine produces an amount of engine power that meets a load demand corresponding to the adjusted operation of the generator.

In another embodiment, a system is provided for controlling power provided by a work machine. The system may include a drive train system having a generator for receiving engine power from an engine and a motor for producing power to a travel mechanism that allows the work machine to travel across a terrain surface. Additionally, the drive train system may include a motor control system for receiving speed data reflecting a ground speed of the work machine and for generating a motor control signal based on the ground speed. Based on the motor control signal, the motor provides the power. The motor control system uses a parameter map having information reflecting one or more relationships between engine power, power, and track or wheel speed to generate the motor control signal. The engine adjusts its engine power based on the power produced by the motor.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Figure 2:
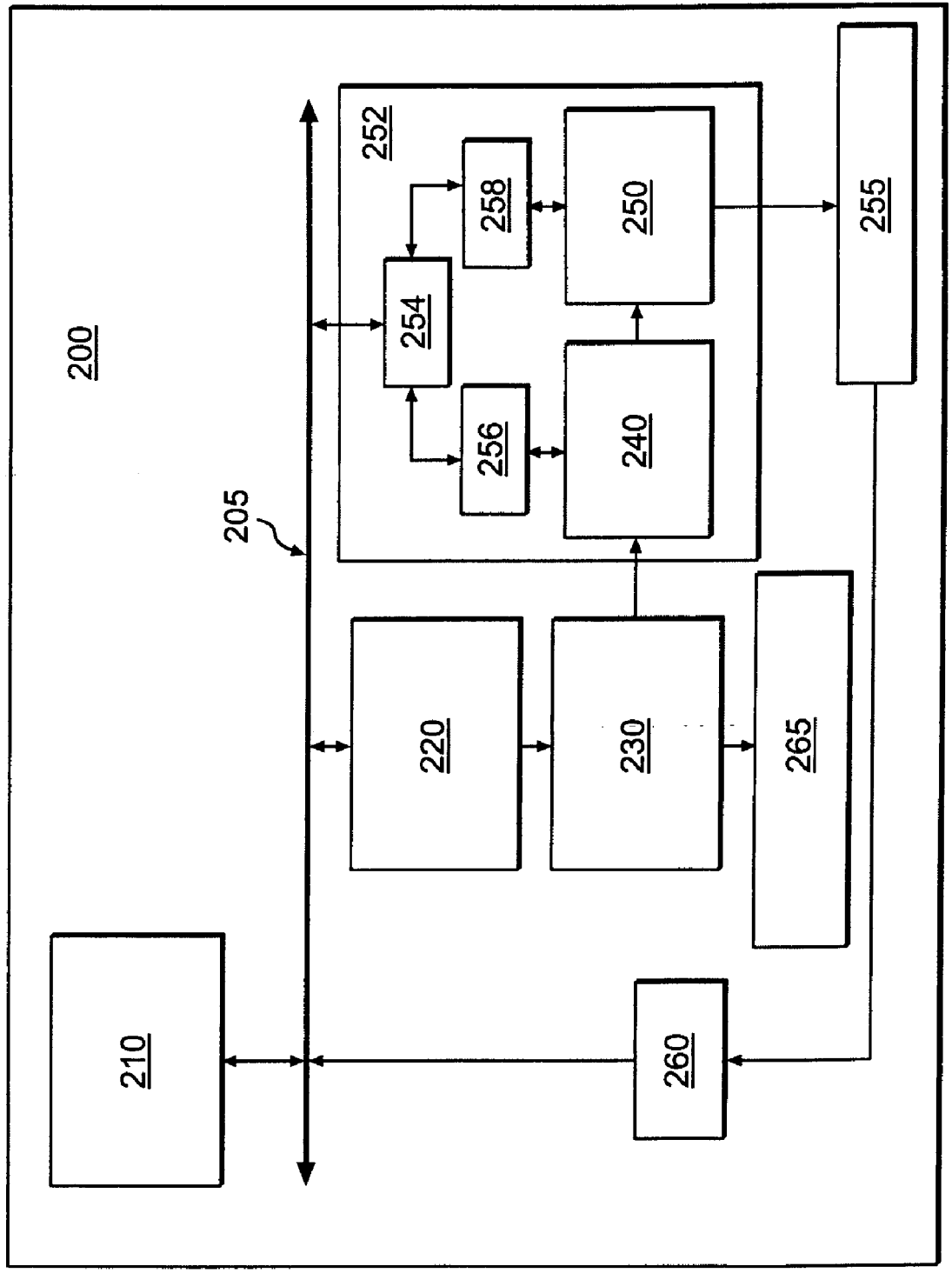
FIG. 2 illustrates a block diagram of an exemplary work machine system consistent with embodiments of the present invention.

FIG. 2 illustrates a block diagram of an exemplary work machine 200 that may be configured to perform certain functions consistent with embodiments of the present invention. Work machine 200 may be a mobile machine that performs at least one operation associated with a particular industry, such as mining, construction, farming, etc. and operates between or within work environments (e.g., construction site, mine site, power plant, etc.). Work machine 200 may also be a mobile machine that operates in non-industrial settings (e.g., machines for personal use). For example, work machine 200 may represent a commercial machine, such as a truck, a crane, an earth moving machine, a mining machine, a backhoe, material handling equipment, farming equipment, and any type of machine that operates in a commercial or industrial environment.

As shown, work machine 200 includes at least an on-board data link 205, a work machine control system 210, an engine control system 220, an engine 230, a generator system 240, an electric motor 250, a ground travel mechanism 255, a sensor 260, and an auxiliary load system 265.

On-board data link 205 represents one or more proprietary and/or non-proprietary data links that interconnect modules included in work machine 200. In one embodiment of the present invention, data link 205 may represent Society of Automotive Engineers (SAE) J1939, Controller Area Network (CAN), etc. standard data links.

Control system 210 represents one or more systems, devices, and/or mechanisms configured to perform certain control functions for work machine 200 and/or components of work machine 200. Control system 210 may be implemented by one or more hardware, software, and or firmware components. In certain embodiments, control system 210 may be an ECU embedded in work machine 200, although other forms of control modules may be implemented. Control system 210 may receive sensor signals from one or more sensors within work machine 200 and produce commands for controlling one or more other elements of work machine 200, including other control systems.

Engine control system 220 represents one or more systems, devices, and/or mechanisms configured to perform certain control functions for work machine 200 and/or components of work machine 200, such as engine 230. Control system 220 may be implemented by one or more hardware, software, and or firmware components. In certain embodiments, control system 220 may be an ECU embedded in work machine 200, although other forms of control modules may be implemented. Engine control system 220 may receive signals and commands from control system 210. Based on these signals and commands, control system 220 may generate one or more signals for controlling the operations of engine 230. Engine control system 220 may perform self governing processes that adjust the operations of engine 230 based on loads experienced by work machine 200.

Engine 230 represents an engine that provides power for work machine 200 and its components. Engine 230 may be a diesel engine (although other types of engines are contemplated by embodiments of the invention) that generates and transfers power to other components of work machine 200 through a power transfer mechanism, such as a shaft.

Generator 240 represents an electric generator that receives power produced by engine 230 and transfers it into power for electric motor 250. Electric motor 250 represents a motor that transfers the electric power received from generator 240 into power that drives one or more ground travel mechanisms 255.

Collectively, generator 240 and electric motor 250 represent a drive train system 252 for work machine 200.

In one embodiment, drive train system 252 includes additional components for controlling operations of generator 240, motor 250, and any other component within drive train system 252. For instance, FIG. 2 shows drive train system 252 including a master control system 254 that is one or more systems, devices, and/or mechanisms configured to perform certain control functions for controlling the operations of drive train system 252. Master control system 254 may be implemented by one or more hardware, software, and or firmware components and receives commands, signals, and/or data from one-board data link 205 or any other component of work machine 200. Based on the received information, master control system 254 generates one or more command signals for controlling different components of drive train system 252, such as a generator control system 256 and a motor control system 258.

Generator control system 256 is one or more systems, devices, and/or mechanisms configured to perform certain control functions for controlling the operations of generator 240. Control system 256 may be implemented by one or more hardware, software, and or firmware components. Motor control system 258 is also one or more systems, devices, and/or mechanisms configured to perform certain control functions for controlling the operations of motor 250 and may be implemented by one or more hardware, software, and or firmware components.

Ground travel mechanism 255 may represent one or more types of mechanical components that allow work machine 200 to travel on the surface of a type of terrain (i.e., earth surface terrain, subterranean surfaces, underwater surfaces, etc.). Such components may include wheels, axles, tracks, sprockets associated with tracks, etc.). As work machine 200 travels on a terrain surface, one or more sensors 260 may measure, collect, and send speed signals to control system 210 reflective of the speed of the machine. Sensor 260 may send speed signals to control system 210 in response to a request from system 210, or sensor 260 may be configured to send the speed signals periodically or in response to a machine event, such as increase in speed, a deceleration event, etc.

Auxiliary load mechanism 265 is one or more mechanisms operating in work machine 200 that draw power from engine 230 to perform some dedicated work related task. For example, auxiliary load mechanism may represent the components used to drive a bucket or shovel that work machine 200 uses to move earth or material. The user operating work machine 200 may control the operations of auxiliary load mechanism 265 to selectively perform certain tasks. Accordingly, during operation of work machine 200, auxiliary load mechanism may or may not produce a load demand for engine 230.

In certain embodiments, control system 210 sends one or more commands to one or more components of work machine 200 for controlling their operations. For example, control system 210 may send a command to control system 220 in response to speed signals from sensor 260. Alternatively, control system 210 may send speed signals from sensor 260 to master control system 254 over data link 205.

Figure 3:
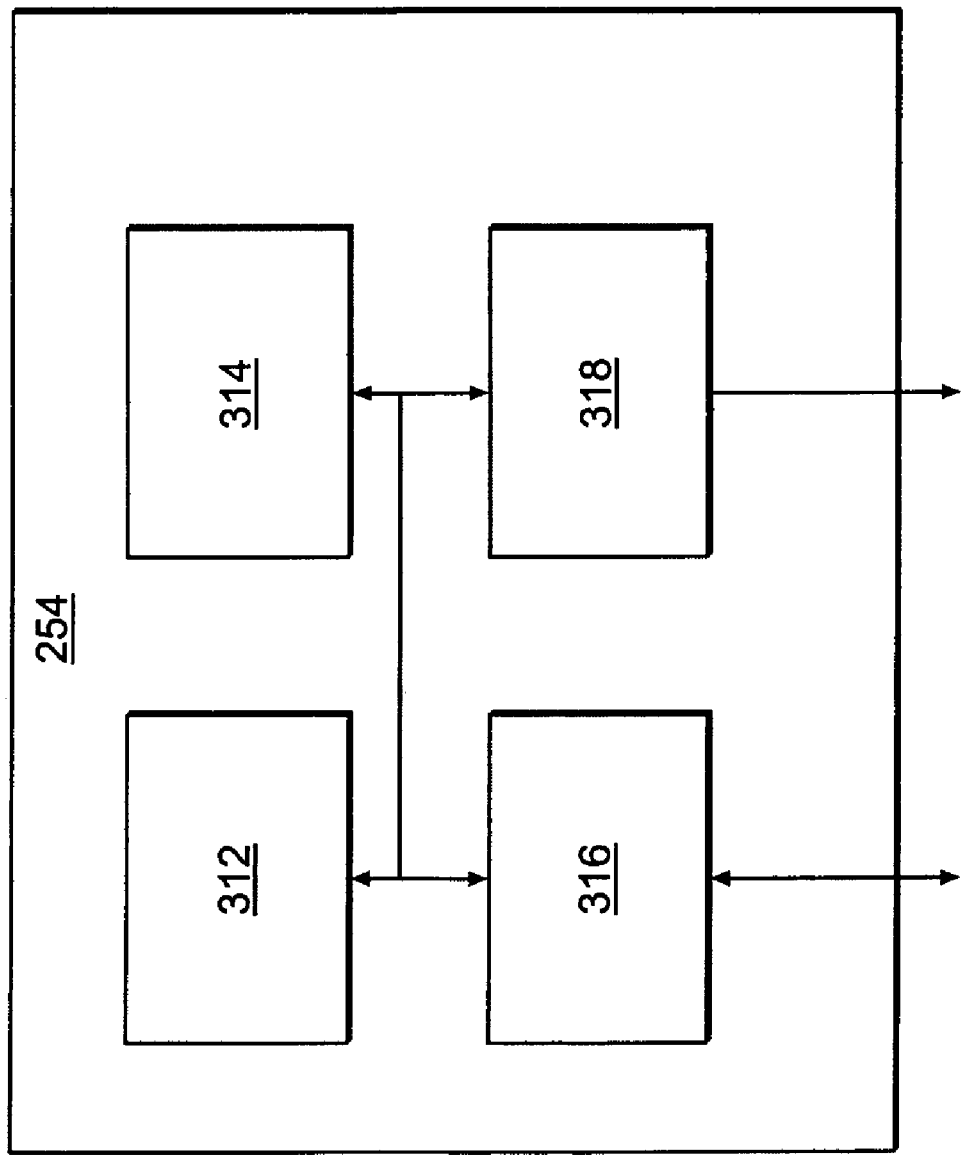
FIG. 3 illustrates a block diagram of an exemplary control system consistent with embodiments of the present invention.

Master control system 254 may be configured to perform standard engine control unit functions for work machine 200. Additionally, master control system 254 may be configured to initiate and perform one or more drive train control processes consistent with certain embodiments of the present invention. FIG. 3 shows an exemplary master control system 254 according to these embodiments. As shown, master control system 254 may include a processing unit 312, a memory device 314, a sensor interface 316, and a control signal interface 318.

Processing unit 312 may represent one or more logic and/or processing components used by engine control system 254 to perform certain communications and control functionalities. For example, processing unit 312 is configured to execute instructions from a storage device, such as memory 314. Although FIG. 3 illustrates a single processor unit, master control system 220 may include a plurality of processor units, such as one or more general purpose processing units and/or special purpose processor units (e.g., ASICS). Processing unit 312 may also include, for example, one or more of the following: a co-processor, memory, registers, and other processing devices and systems as appropriate.

In certain embodiments, the functionality of processing unit 312 may be embodied within an integrated microprocessor or microcontroller. Such a microcontroller may, for example, include an integrated CPU, memory, and one or more peripherals. Depending on the implementation, master control system 254 may include one or more microcontrollers in addition to or in place of processing unit 312 and memory 314, such as the Microchip's PIC, the 8051, Intel's 80196, and Motorola's 68HCxx series microcontrollers.

Memory 314 may represent one or more systems and/or mechanisms capable of storing information. Memory 314 may be embodied with a variety of components and/or subsystems, including a RAM (random access memory), a ROM (read-only memory), magnetic and optical storage elements, organic storage elements, audio disks, and video disks. In certain embodiments, memory 314 may include one or more programmable, erasable and/or re-useable storage components, such as EPROM (erasable programmable read-only memory) and EEPROM (erasable programmable read-only memory). Memory 314 may also include constantly-powered nonvolatile memory operable to be erased and programmed in blocks, such as flash memory (i.e., flash RAM). Memory 314 may provide a primary memory for processor 312, such as for storing program code. For example, memory 314 may include program code for communications; kernel and device drivers; configuration information, and other applications that might be embedded within master control system 254. Further, memory 314 may store one or more performance maps that are used by a control process executed by processing unit 312. The performance maps may each include data reflecting relationships between various parameters of drive train system 252 components, such as motor 250 and generator 240. For example, memory 312 may include a performance map that associates ground speed of work machine 200 with parameters that control the amount of power produced by motor 250. Although a single memory is shown, any number of memory devices may be included in master control system 254, and each may be configured for performing distinct functions.

Sensor interface 316 may be an optional device that is configured to receive one or more sensor signals from one or more respective sensors 260. In one embodiment, master control system 254 extracts the signals received at sensor interface 316 and provides them to processing unit 312 and/or memory 314 for subsequent processing. Alternatively, master control system 254 may receive sensor signals over a data link (e.g., data link 205).

Control signal interface 318 may represent one or more interface devices that provides one or more master control signals to generator control system 256 or motor control system 258. The engine control signals provide information that direct the control systems 256 and 258 to adjust operations of their respective components (e.g., generator and/or motor). Adjusting operations may include increasing the amount of power produced by motor 250 by increasing its speed or torque or both, adjusting the amount of power produced by generator 240 based on the amount of power drawn by motor 250, etc.

Generator control system 256 and motor control system 258 each may be configured in a manner consistent with the above description of master control system 254. For example, each control system 256 and 258 may include a control signal interface for receiving control signals from master control system 254 or another type of component in work machine 200. Further, the control signal interface may provide an interface for providing control signals to their respective controlled components, such as generator 240 and motor 250.

Figure 4:
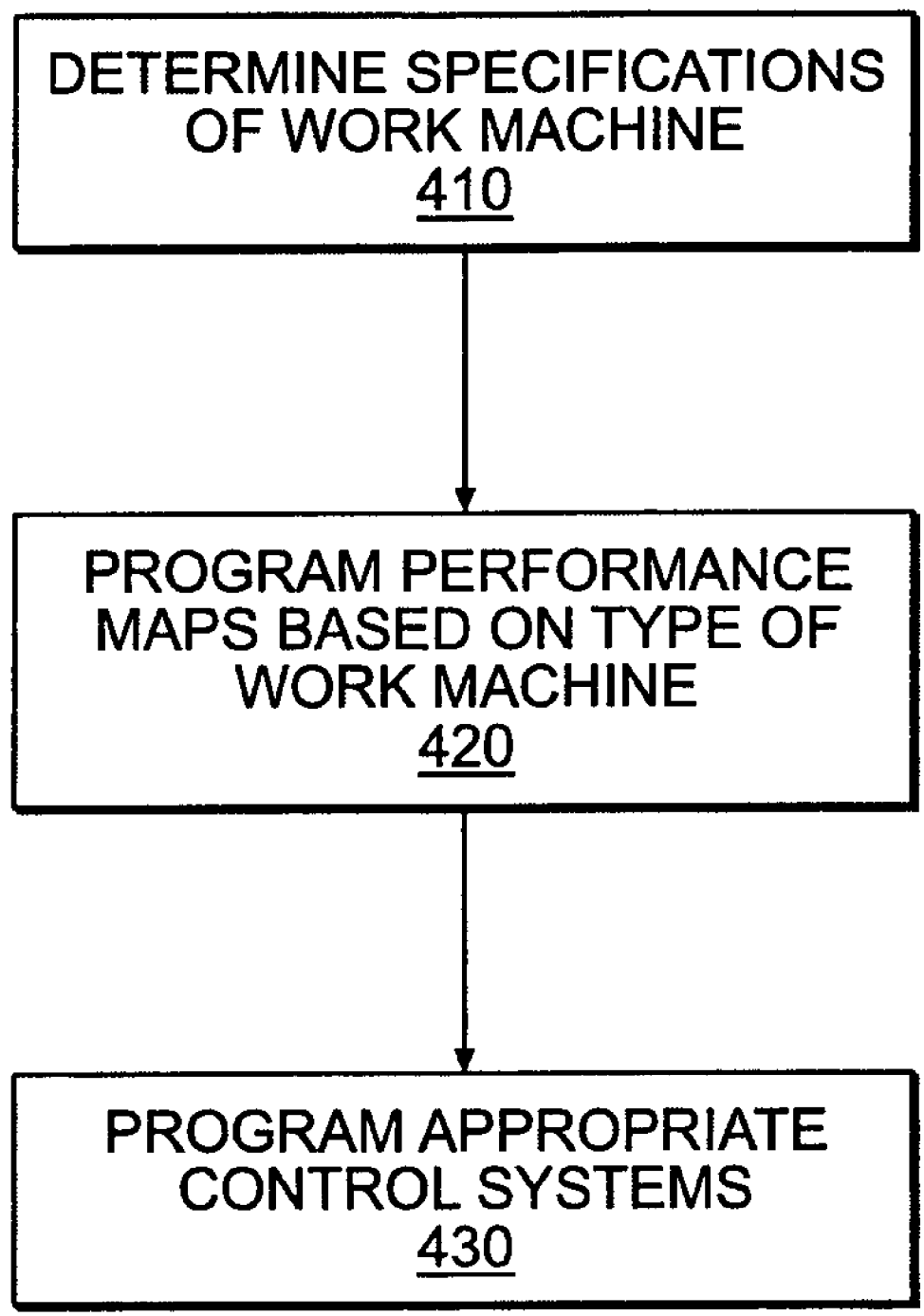
FIG. 4 illustrates a flowchart of an exemplary control system program process consistent with embodiments of the present invention.

As mentioned, methods and system consistent with embodiments of the present invention enable master control system 254 to use one or more processes and performance maps that control drive train system 252 operations in a manner that adjusts the operations of electric motor 250. FIG. 4 illustrates a flowchart of an exemplary control system program process consistent with embodiments of the present invention. Initially, a user, or program executed by a processor, may determine the type of work machine that hosts, or will host, master control system 254, generator control system 256, and/or motor control system 258. Based on this determination, the specifications of various components of work machine 200 may be collected and/or ascertained, such as motor 250, generator 240, etc. (Step 410). As explained, work machine 200 may represent different types of work machines that include different types of components that have various operational specifications. For example, a motor for a track type tractor may be designed to operate to produce a maximum amount of power that is different for dozing versus ripping applications. Further, each of these components may have associated parameters that have varying tolerances based on other types of parameters associated with other components of the work machine. For instance, a generator supplying electrical power to a motor may be configured to accept a maximum amount of power from an engine, as well as have limits to the amount of power it may supply to the motor based on a desired ground speed of the work machine.

Based on the collected or ascertained work machine specification information, a user, or a computer executed process, may determine one or more performance maps for various components of work machine 200 (Step 420). The performance maps may each include one or more data reflecting one or more power curves that one or more drive train components, such as motor 250, may follow to operate in a manner consistent with embodiments of the present invention. Because work machine 200 is an electric-drive machine, the power is transmitted from the engine to the ground travel mechanism but with a different type of device, instead of torque converter and clutches accomplishing the transfer, it is transferred through electric generators, and motors. Using known relationships between the specifications of generator 240, electric motor 250, and engine 230 as well as other parameters, such as ground speed, torque, etc., a user, or a computer executed process, may define or shape the power curves in the performance maps to enable work machine 200 to operate at predetermined power levels and speeds based on other parameters. To better illustrate these features of the present invention, FIG. 5 shows a graph of exemplary power curves associated with work machine 200 that are consistent with embodiments of the present invention.

Figure 5:
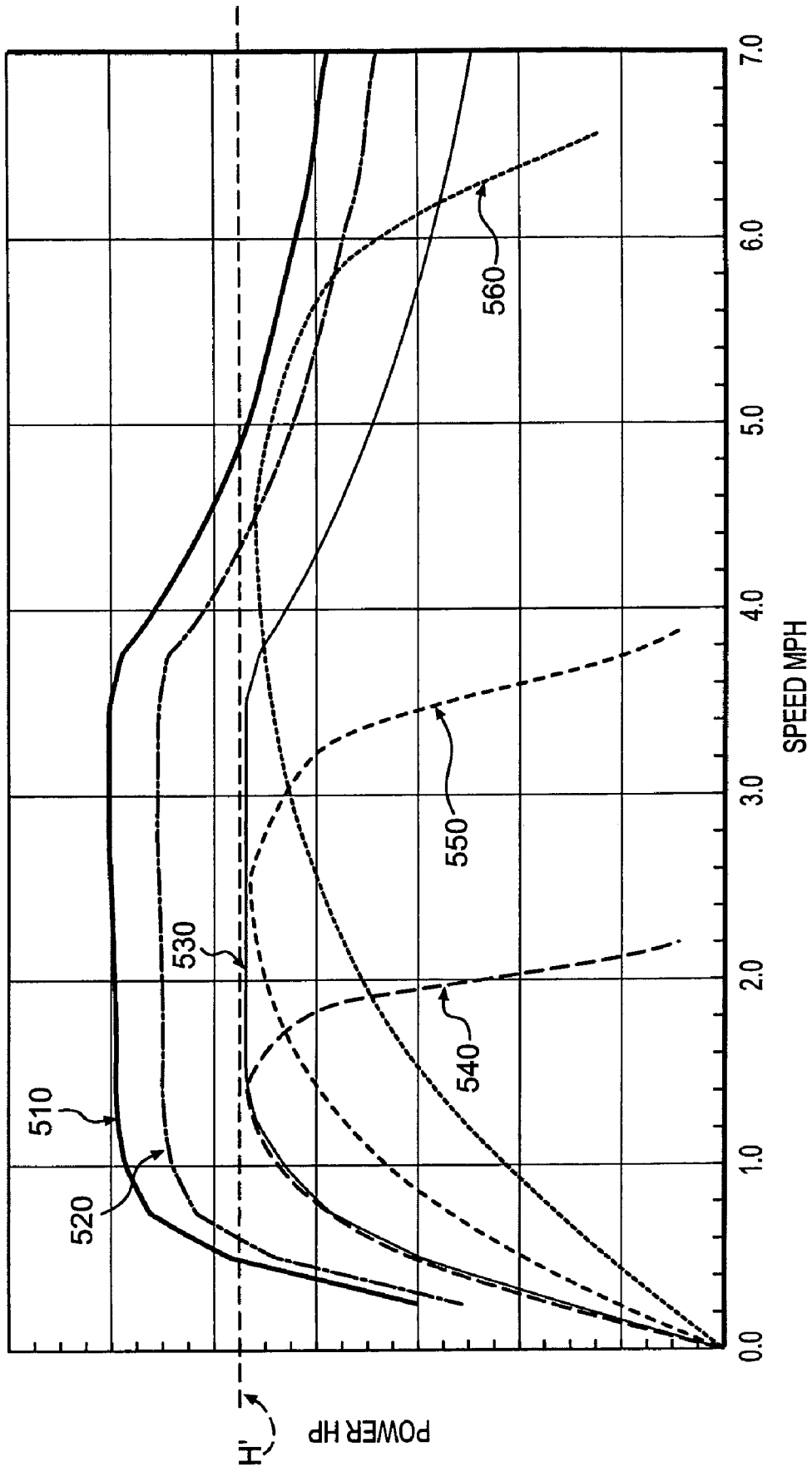
FIG. 5 illustrates a graph of exemplary power curves for an electric drive work machine consistent with embodiments of the present invention.

As shown, FIG. 5 includes six curves 510-560. Curves 510-530 are associated with work machine 200 with an electric drive system. Curve 510 represents the power output by engine 230 at varying ground speeds. Curve 520 represents the power provided to drive train system 252 of work machine 200 (e.g., the power provided to generator 240). Curve 530 represents the power provided to travel mechanism 255 that allows work machine 200 to travel across terrain surfaces. In contrast, curves 540-560 belong to work machine 200 with a conventional torque converter system (instead of electric drive system) and represent the working power available to travel mechanism 255 in various gears (e.g., first through third forward gear, respectively). As can be seen, the working ground power (i.e., power provided by travel mechanisms 255) for work machine 200 when equipped with a torque converter system follows one or more predetermined pseudo-parabolic paths based on the transmission gear machine 200 is operating. In one embodiment, work machine 200 may be configured with electric drive system's working power curve 530 to match or exceed the power curves (540-560) for work machine 200 with a torque converter system. In this example, the electric drive machine controls and shapes the power to travel mechanism 255 to a predetermined shape shown as curve 530.

To increase the performance and efficiency of work machine 200 with electric drive, a user, or computer executed process, may shape the ground power (i.e., curve 530) based on the known performance of work machine 200 at certain ground speeds. That is, a user may define a performance map that allows the power provided by the drive train system 252 to match or exceed the power curves (540-560) for work machine 200 with a torque converter system. In one embodiment, the power curves associated with drive train system 252 may have a proportional relationship with the power curves of engine 230. For instance, adjustments made to curve 530 may result in less power being drawn from engine 230. As a result, the power level of curves 510 and 520 may or may not be lowered depending on the power being absorbed by auxiliary load system 265. Thus, curves 510 and 520 may reflect engine's 230 reaction to curve 530 in the event that there is no power demand from 265. Knowing this, a user, or a computer executed process, may define a performance map to control the power produced by motor 250. That is, the power produced by generator system 240 may be a reaction to the demand from motor 250 as well as demand from other electric components and functions, such as electric pumps, charging of work machine's 200 batteries, electric air conditioning, etc. In the absence of any of these types of demands, the reaction of work machine 200 to curve 530 may be represented by curve 520, based on, for example, the ground speed of work machine 200.

Curves 510-530 illustrates the above described embodiments of the present invention. As explained, performance curve 530 associated with the power produced by motor 250 affects the performance curves of power output by engine 230 (e.g., curve 510) and provided to generator 240 (e.g., curve 520). As shown in FIG. 5, the power provided by engine 230 (i.e., curve 510) at low speeds (e.g., 0-1.5 mph) is reduced significantly because of the relationship between the power curves associated with drive train system 252. Thus, during low speed conditions, for example, engine 230 may produce lower output power based on the lower output power produced by drive train mechanism 252 (i.e., curve 530) and provided to generator 240 (i.e., curve 520).

Following curve 530, the power of drive system 252 may follow a path that matches or exceeds a combination of the maximum ground power produced by travel mechanism 255 in the different operational gears and ground speeds of work machine 200 with torque converter system (e.g., curves 540-

560). In this example, a user may create a performance map that includes a drive train power curve 530 that directs drive train system 252 to operate at a certain power level (e.g., power level H') when work machine travels at certain ground speeds (e.g., 1.5 and 3.5 mph). At speeds above a certain value (e.g., 3.5 mph), the power provided by drive train system 252 may begin to decline. Based on the power provided by drive train system 252 (i.e., motor 250), the power provided to generator 240 may change. That is, if motor 250 must produce additional power to move work machine 200 at a faster ground speed or higher load, generator 240 may require additional power from engine 230 to compensate for this change. Accordingly, curve 520 follows a similar path as curve 510 at different levels of power. Along the same lines, engine 230 may adjust its output power to allow motor 250 to increase the ground speed of work machine 200. Accordingly, curve 510 may follow a similar path of curves 520 and 530 at different power levels.

Referring back to FIG. 4, once the power curves for associated components of work machine 200 are determined, and the performance maps are created, they may be programmed into the appropriate control systems (Step 430). In one embodiment, the performance maps may be flashed into memory 314 of master control system 254 while embedded within work machine 200. Additionally, or alternatively, the performance maps may be programmed into master control system 254 prior to being configured within work machine 200. In such a case, the programmed control system 254 may be embedded within work machine 200 at a later time, prior to operation. Also, the performance maps may be programmed into selected control systems within drive train system 252. For example, a motor control system 258 may receive performance maps that are specific to the performance of motor 250 and generator control system 256 may receive performance maps that are specific to the performance of generator 240. Additionally, both controls system 256 and 258 may receive similar performance map information to allow master control system 254 to control drive train system 252 in accordance with embodiments of the present invention.

In addition to the performance maps, master control system 254 is also programmed with one or more programs that allow it to adjust the operations of drive train system 252 based on one or more input parameters. In one embodiment, master control system 254 is programmed with a software program that analyzes speed sensor signals provided by sensor 260 and/or user command signals provided by a user operating work machine 200 to determine how drive train system 252 should operate. These features of the present invention are described below with respect to FIG. 6.

Figure 6:
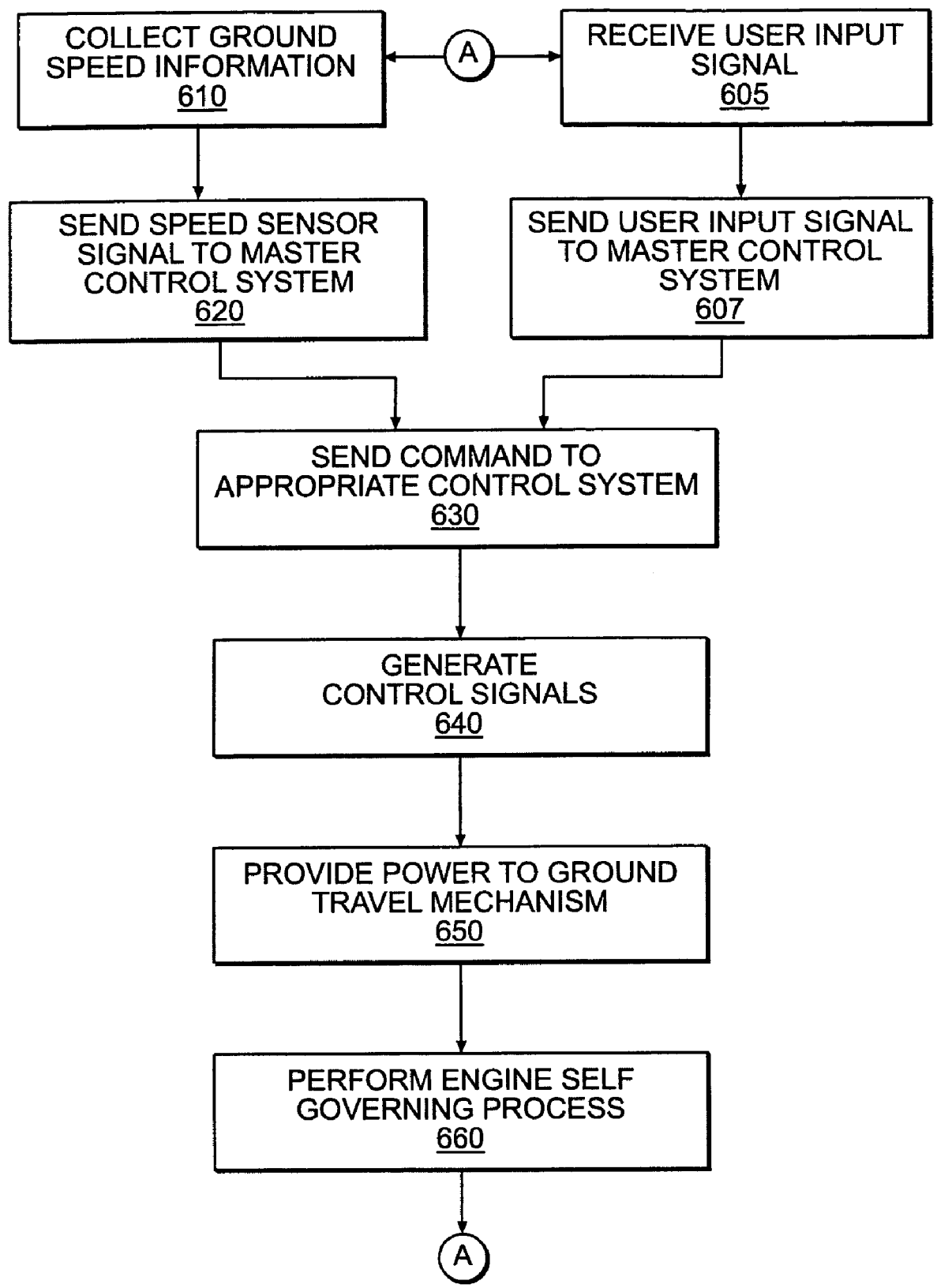
FIG. 6 illustrates a flowchart of an exemplary power control process consistent with embodiments of the present invention.

As explained, methods and systems consistent with embodiments of the present invention program control systems 252-258 with power curve information and software that enables them to adjust the power provided by drive train system 252 based on, for example, the ground speed of work machine 200. FIG. 6 shows a flowchart of an exemplary power control process consistent with embodiments of the present invention.

During operation of work machine 200, the power provided by drive train system 252 and engine 230 may vary based on the load and/or ground speeds of machine 200. During operation of work machine 200, a user may initiate a command for adjusting the power provided by drive train system 252, such as increasing or decreasing the ground speed of work machine 200 (Step 605). This command is sent from a mechanism associated with the user request (e.g., accelerator pedal, lever, etc.) to master control system 254 via data link 205 (Step 607).

Additionally, or alternatively, sensor 260 collects ground speed information reflecting the current ground speed of machine 200 (Step 610). Once collected, sensor 260 may send a speed signal to master control system 254 over one or more dedicated sensor communication paths, or over an on-board data link (e.g., data link 205) (Step 620).

Based on the speed signal and/or user input signal, master control system 210 creates a command message that includes data reflecting the current or user requested ground speed of work machine 200. Master control system 254 may perform a process that accesses the one or more performance maps stored in memory 314 to analyze the information stored therein with the current ground speed information sent by sensor 260 and/or the user input signal. For example, referring to FIG. 5, if the user command requests that work machine 200 travel at a certain ground speed, master control system 254 may generate master control signals that direct motor control system 258 to control motor 250 to produce the required power associated with that ground speed. Additionally, or alternatively, master control system 254 may produce master control signals that direct generator control system 256 to control generator 240 to operate in a manner consistent with the power curve associated with the drive-train input power curve 520.

Once created, master control system 254 sends the master control signals to the appropriate control system (e.g., control systems 256 and/or 258) (Step 630). Based on the received signals, the appropriate control system may execute a power control program stored in its internal memory to generate one or more control signals for its appropriate controlled component, such as generator 240 and/or motor 250 (Step 640). For example, motor control system 258 may process the master control signals in accordance with the performance map curve data associated for the drive train power output curve 530.

Once generated, motor control system 258 sends the motor control signals to motor 250. In response to these signals, motor 250 adjusts its operations to produce the amount of power directed by the motor control signals. The power produced by motor 250 is transferred to ground travel mechanism through a power transfer mechanism, such as a shaft rotating at a speed (e.g., rpm) corresponding to the operations of motor 250 (Step 650). The transferred power received at ground travel mechanism 255 enables work machine 200 to travel at the ground speeds associated with those reflected in the performance maps used by master control system 254 and/or motor control system 258. For example, referring to FIG. 5, at a speed of 3 mph, motor 250 is producing H' hp of power to travel mechanism 255 to maintain that ground speed.

The power produced by motor 250 may affect the operation of other components of work machine 230. Engine control system 220 may be configured to adjust its operations independently of the processes performed by drive train system 252. In one embodiment, engine control system 220 may execute a self governing process stored in an internal memory for adjusting the speed of engine 230 to compensate for changing load conditions (Step 660).

For example, in a situation where motor 250 requires less or more power, generator 240 adjusts its operations accordingly, thus changing the load for drive train system 252. This, in turn, may change the ground speed of work machine 200 and the load on engine 230. This, in turn, may cause engine 230 to adjust its speed (e.g., increase rpm) based on the load required by generator 240. For example, engine 230 may detect a change in its torque output, thus adjusting its engine speed based on the load changes associated with the adjusted operations of generator 240. Engine control system 220 may recognize the change in engine speed and analyze a performance map associated with engine 230. The engine performance map may include information reflecting relationships between engine speed (e.g., rpm) and torque values provided by engine 230 for various load conditions. Based on the analysis, engine control system 220 may generate engine control signals that direct engine 230 to produce a certain amount of power (e.g., lower hp) associated with the detected engine speed and load condition required by generator 240. For example, engine control system 220 may provide control signals that adjust the amount of fuel to engine 230. Accordingly, engine 230, through engine control system 220, may self govern itself independently of drive train system 252 control signals to provide a certain level of power (e.g., maximum power) to generator 240.

Although the performance of engine 230 may follow the performance curves programmed in the performance maps of control systems 254-258, circumstances may arise where the amount of power produce by the engine may change due to other load requirements for work machine 200. For example, in circumstances where auxiliary load mechanism 265 demands power from engine 230, engine control system 220 may direct engine 230 to produce certain levels of power to compensate for the additional load by auxiliary load mechanism. Accordingly, in such situations, engine control system 220 may further adjust the power produced by engine 230 independently of the power curve relationships between curves 510 and 520 shown in FIG. 5.

The power control process depicted in FIG. 6 may be repeated in real time as work machine 200 operates to control the performance of drive train system 252 and/or engine 230.

As described, embodiments of the present invention allow engine 230 to provide a predetermined maximum level of engine power to drive train system 252 (e.g., generator 240) independently of the level of power produced by motor to ground travel mechanism 255. That is, engine 230, through engine control system 220, may self govern itself to ensure it independently adjusts the level of engine power to provide a range of engine power levels to generator 240 to allow generator 240 to provide maximum power to motor 250.

ALTERNATIVE EMBODIMENTS

As described above, work machine 200 is configured to perform drive train control processes independent of the operations of engine 230. Adjustments made to the power provided by motor 250 may directly affect the performance of generator 240 and/or engine 230. However, methods and systems consistent with alternative embodiments of the present invention may be configured to allow the operations of motor 250 and generator 240 to follow the performance of engine 230. Although the following description of these alternative embodiments reference work machine 200 in FIG. 2, the machine may be configured with different types of components and operate in a manner similar or differently from the operations described above with respect to FIG. 2 to perform in accordance with the following alternative embodiments.

Figure 7:
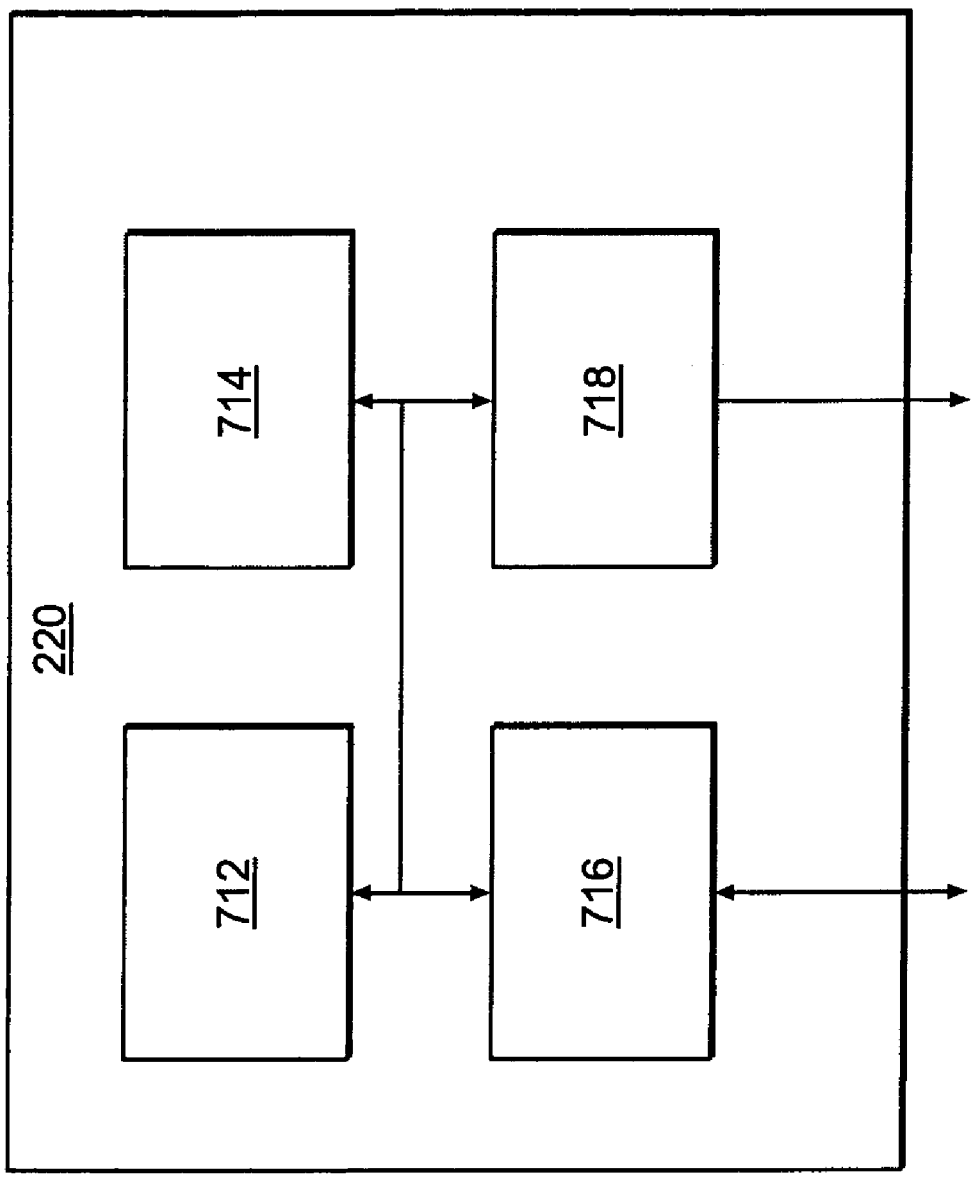
FIG. 7 illustrates a block diagram of another exemplary control system consistent with embodiments of the present invention.

For example, engine control system 220 may be configured to perform standard engine control unit functions for work machine 200. Additionally, engine control system 220 may be configured to initiate and perform one or more engine control processes consistent with certain embodiments of the present invention. FIG. 7 shows an exemplary engine control system 220 according to these embodiments. As shown, engine control system 220 may include a processing unit 712, a memory device 714, a sensor interface 716, and a control signal interface 718.

Processing unit 712 may represent one or more logic and/or processing components used by engine control system 220 to perform certain communications and control functionalities. For example, processing unit 712 is configured to execute instructions from a storage device, such as memory 714. Although FIG. 7 illustrates a single processor unit, engine control system 220 may include a plurality of processor units, such as one or more general purpose processing units and/or special purpose processor units (e.g., ASICS). Processing unit 712 may also include, for example, one or more of the following: a co-processor, memory, registers, and other processing devices and systems as appropriate.

In certain embodiments, the functionality of processing unit 712 may be embodied within an integrated microprocessor or microcontroller. Such a microcontroller may, for example, include an integrated CPU, memory, and one or more peripherals. Depending on the implementation, engine control system 220 may include one or more microcontrollers in addition to or in place of processing unit 712 and memory 714, such as the Microchip's PIC, the 8051, Intel's 80196, and Motorola's 68HCxx series microcontrollers.

Memory 714 may represent one or more systems and/or mechanisms capable of storing information. Memory 714 may be embodied with a variety of components and/or subsystems, including a RAM (random access memory), a ROM (read-only memory), magnetic and optical storage elements, organic storage elements, audio disks, and video disks. In certain embodiments, memory 714 may include one or more programmable, erasable and/or re-useable storage components, such as EPROM (erasable programmable read-only memory) and EEPROM (erasable programmable read-only memory). Memory 714 may also include constantly-powered nonvolatile memory operable to be erased and programmed in blocks, such as flash memory (i.e., flash RAM). Memory 714 may provide a primary memory for processor 712, such as for storing program code. For example, memory 714 may include program code for communications; kernel and device drivers; configuration information, and other applications that might be embedded within engine control system 220. Further, memory 714 may store one or more performance maps that are used by a control process executed by processing unit 712. The performance maps may each include data reflecting relationships between various parameters of engine 230, and other components of work machine 200. For example, memory 712 may include a performance map that associates ground speed of work machine 200 with fuel injection parameters that control the amount of power produced by engine 230. Although a single memory is shown, any number of memory devices may be included in engine control system 220, and each may be configured for performing distinct functions.

Sensor interface 716 may be an optional device that is configured to receive one or more sensor signals from one or more respective sensors 260. In one embodiment, engine control system 220 extracts the signals received at sensor interface 716 and provides them to processing unit 712 and/or memory 714 for subsequent processing. Alternatively, engine control system 220 may receive sensor signals over a data link (e.g., data link 205).

Control signal interface 718 may represent one or more interface devices that provides one or more engine control signals to engine 230. The engine control signals provide information to one or more components of engine 230 that enable engine to adjust its operations (e.g., adjust engine speed).

As mentioned, methods and system consistent with embodiments of the present invention enable engine control system 220 to use one or more processes and performance maps that control engine operations in a manner that adjusts the operations of electric motor 250. These performance maps may be programmed in a manner similar to the process steps described above in connection with FIG. 4.

For example, to increase the performance and efficiency of work machine 200, a user, or computer executed process, may shape the ground output power (i.e., curve 530) based on the known performance of work machine 200 at the ground power level. That is, a user may define a parameter map that allows the power provided by the drive train system 252 to match or exceed curves 540-560. In one embodiment, the power curves associated with drive train system 252 have a direct relationship with the power curves of engine 230. In other words, adjustments made to curve 510 have a direct affect on adjustments made to curves 520 and 530 (i.e., curve 530 reflects the results of curve 510 being shaped according to predetermined specifications). Knowing this, a user may define a performance map to control the power required by engine 230 at certain ground speeds. In doing so, the power provided by engine 230 may be adjusted to reduce power loss at certain speeds.

Curves 510-530 may also be used to illustrate the above described alternative embodiments of the present invention. As shown in FIG. 5, the power provided by engine 230 (i.e., curve 510) at low speeds (e.g., 0-1.5 mph) is reduced significantly because of the relationship between the power curves associated with drive train system 252 and engine 230. Thus, during low load conditions, for example, engine 230 may be controlled to provide lower maximum power, allowing the ground power provided by drive train system 252 to closely follow a similar performance curve as the ground power output by travel mechanism 255 at these speeds. Following curve 530, the power of drive system 252 may follow a path that matches or exceeds a combination of the maximum ground power produced by travel mechanism 255 in the different operational gears and ground speeds of work machine 200 with torque converter system (e.g., curves 540-560). In this example, a user may create a performance map that includes a drive train power curve that directs drive train system 252 to operate at a certain power level when work machine travels at certain ground speeds (e.g., 1.5 and 3.5 mph). At speeds above a certain value (e.g., 3.5 mph), the power provided by drive train system 252 may begin to decline, following the power curve of engine 230 (i.e., curve 510).

In addition to the performance maps, engine control system 220 is also programmed with one or more programs that allow system 220 to adjust the operations of engine 230 based on one or more input parameters. In one embodiment, engine control system 220 is programmed with a software program that analyzes speed sensor signals provided by sensor 260 to determine how engine 230 should operate. These features of the present invention are described below with respect to FIG. 8.

Figure 8:
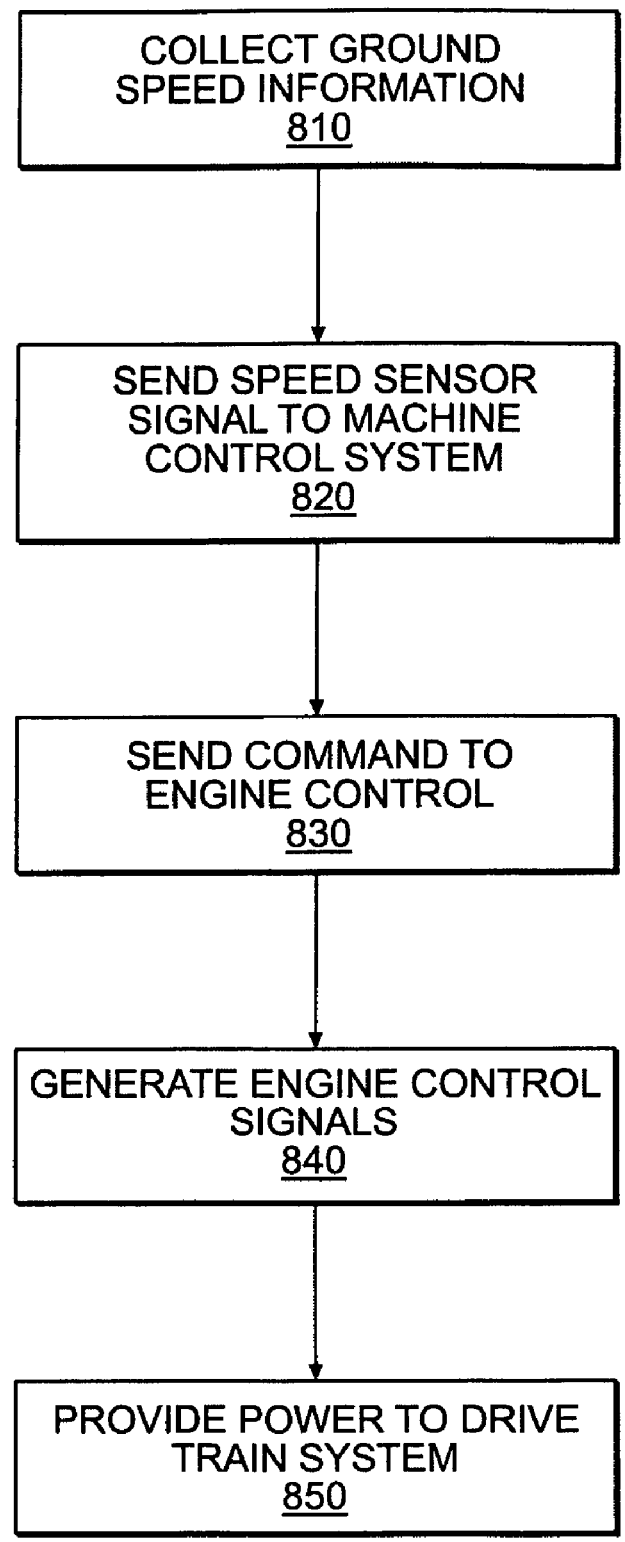
FIG. 8 illustrates a flowchart of another exemplary power control process consistent with embodiments of the present invention.

As explained, methods and systems consistent with embodiments of the present invention program engine control system 220 with power curve information and software that enables it to adjust the power provided by engine 230 based on, for example, the ground speed of work machine 200. FIG. 8 shows a flowchart of an exemplary power control process consistent with embodiments of the present invention.

During operation of work machine 200, the power provided by engine 230 and drive train system 252 may vary based on the load and ground speeds of machine 200. To enable work machine 200 to operate according to the embodiments of the present invention, sensor 260 collects ground speed information reflecting the current ground speed of machine 200 (Step 810). Once collected, sensor 260 may send a speed signal to control system 210 over one or more dedicated sensor communication paths, or over an on-board data link (e.g., data link 205) (Step 820).

Based on the speed signal, control system 210 creates a command message that includes data reflecting the current ground speed of work machine 200. Once created, control system 210 sends the command to engine control system 220 over data link 205 (Step 830). Based on the received command, engine control system 220 may execute a power control program stored in memory 714 to generate one or more engine control signals for engine 230 (Step 840). In one embodiment, engine control system 220 may perform a process that accesses the one or more performance maps stored in memory 714 to analyze the information stored therein with the ground speed information extracted from the command sent by control system 210. For example, referring to FIG. 5, if the ground speed of work machine is one mph, engine control system 220 may generate engine control signals that direct engine 230 to produce a maximum of 100 hp. On the other hand, if the ground speed of work machine 200 is determined to be 3 mph, engine control system 220 may generate engine control signals that direct engine 230 to produce a maximum of 110 hp.

Once generated, engine control system 220 sends the engine control signals to engine 230. In response to these signals, engine 230 adjusts its operations to produce the amount of power directed by the engine control signals. The power produced by engine 230 is transferred to drive train system 252 through a power transfer mechanism, such as a shaft rotating at a speed (e.g., rpm) corresponding to the operations of engine 230 (Step 850). In certain embodiments of the present invention, drive train system 252 provides power to travel mechanism 255, which in turn enables work machine 200 to travel at the ground speeds associated with those reflected in the performance maps used by engine control system 220 to generate the engine control signals. For example, referring to FIG. 5, at a speed of 3 mph, engine 230 is producing a maximum amount of power. Based on this power, electric motor 250 may provide a predetermined amount of power to travel mechanism 255 to maintain that ground speed (e.g., H' of power). The power control process depicted in FIG. 8 may be repeated in real time as work machine 200 operates to control the performance of engine 230 and of drive train system 252, Using this above described processes, engine control system 220 may regulate the power loss of work machine 200 at certain speeds based on the power curves programmed in memory 714.

INDUSTRIAL APPLICABILITY

Methods and systems consistent with embodiments of the present invention allow an electric drive work machine to shape power curves stored in the machine's control units to reduce power loss experienced by the machine. In one embodiment, speed information is sent to a master control unit that is programmed to determine the appropriate power to produce by the machine's motor in order to obtain a predetermined amount of power from the machine's drive train. Once determined, the master control unit (or a motor control unit) adjusts the power produced by the motor, which in turn adjusts the power produced by a generator that drives the motor in a predetermined manner. The power produced by the generator and the machine's engine may follow a predetermined curve based on the power produced by the motor. Using the predictable relationship between the performance of the motor, generator, and engine, control units may be programmed to increase the efficiency of a work machine's performance based on the machine's ground speed.

Figure 1:
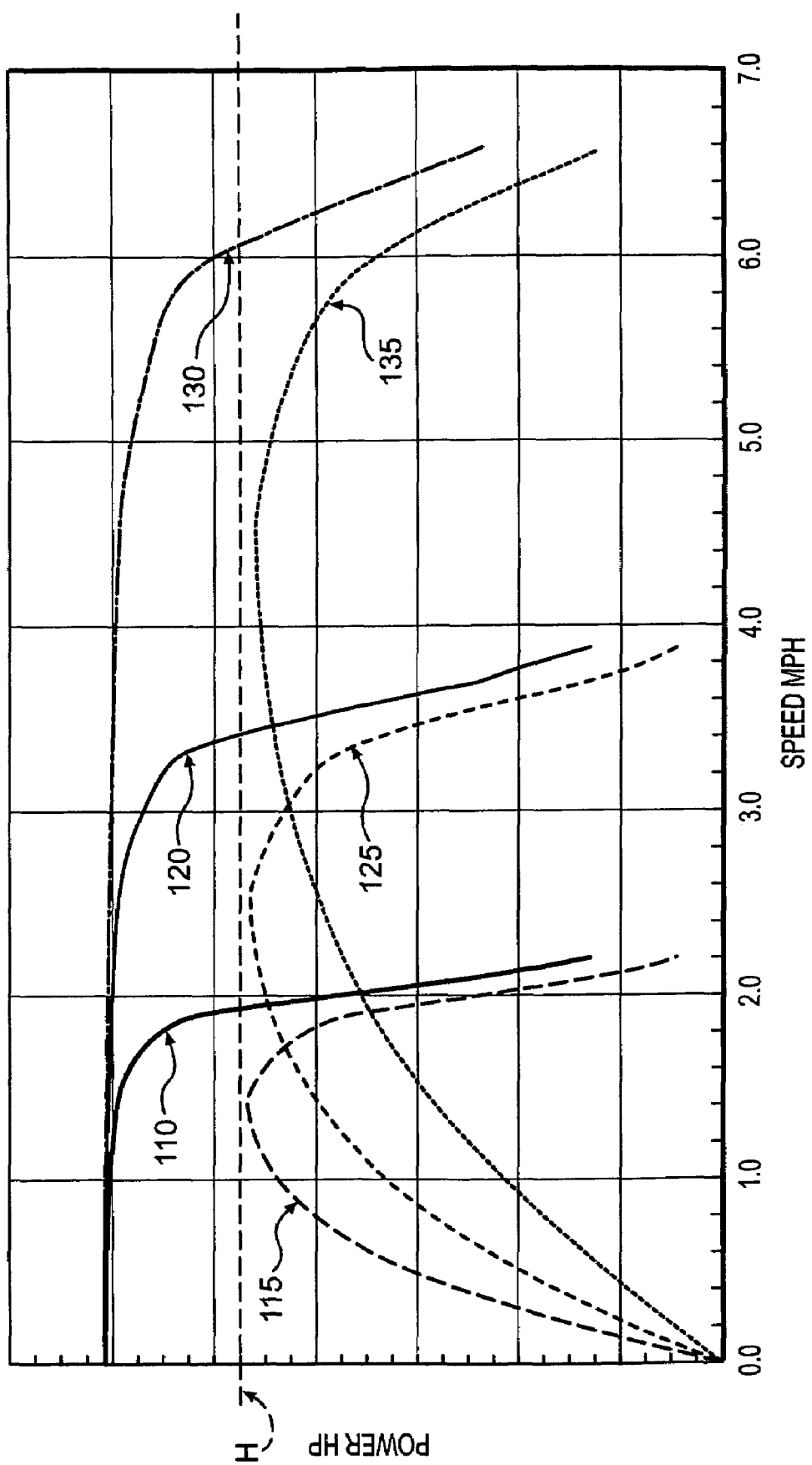
FIG. 1 illustrates an exemplary graph of power curves for a non-electric drive machine.

Methods and system consistent with embodiments of the present invention allow work machine 200 to adjust the power produced by motor 250 based on the ground speed of the machine. As explained, this relationship enables work machine 200 to reduce power loss at certain speeds. Furthermore, controlling the machine's drive train system in this manner enables work machine 200 to reduce track or wheel spin because the torque produced at travel mechanism 255 is limited at low speeds based on the reduced speed of motor 250. This is illustrated by comparing the exemplary curves 110 and 510 shown in FIGS. 1 and 5, respectively. At very low speeds (e.g., 0.2 mph), embodiments of the present invention may reduce the maximum power produced by motor 250 and engine 230 as compared to the power provided by these components at similar speeds for conventional torque converter systems (e.g., see FIG. 1, curve 110 at 0.2 mph). This allows work machine 200 to experience less power loss as compared to conventional torque converter work machines while reducing track or wheel spin.

Thus, embodiments of the invention perform one or more engine control processes that allow engine control system 220 to determine whether the ground speed of work machine 200 is below a certain ground speed (e.g., 1.5 mph), and based on this determination, produce control signal(s) that instruct motor 250 to produce a maximum level of power that is below a maximum level of power that motor 250 produces at ground speeds equal to or above the certain ground speed (e.g., ground speeds between 1.5 mph to 3.5 mph). In certain embodiments, the ground speeds produced by motor 250 when machine 200 is traveling at ground speeds above the certain ground speed may be equal to, or within a predetermined range of, the maximum power motor 250 is configured to produce.

Although embodiments of the present invention have been described in relation to electric drive machines, methods and systems consistent with certain embodiments may be applicable to other forms of indirect drive train systems. For example, embodiments of the present invention may be applied to hydrostatic work machines, which use hydraulic fluid systems to produce power to a travel mechanism for a work machine. Further, embodiments of the present invention may be applied to accessory components of a work machine, where one or more operational parameters of the accessory components may be used to shape power curves for the work machine's engine.

In another embodiment, engine control system 220 may be configured with software that monitors the performance of work machine 200 to analyze the stored performance maps. For example, work machine 200 may be configured with additional sensors that provide engine speed data to engine control system 220. This information, along with the speed signals provided by sensor 260, may be used to analyze the power curve information maintained in the performance maps stored in memory 314. For instance, engine control system 220 may compare current power and engine speed information against corresponding speed and power information stored in one or more of the performance maps in memory 314 to determine whether work machine is operating as expected. In the event there is a discrepancy between these data values, engine control system 220 may be configured to send an error signal to control system 210 for reporting to a user or other work machine components.

Although embodiments of the present invention have been described with respect to the power and speed values depicted in FIG. 5, other values and curves may be implemented. For example, a user may program or shape the performance curves for drive train system 252 according to predetermined specifications associated with different types of work machines. The specifications may be provided, for example, by a customer of a business entity that provides work machine 200 or one or more of its components, such as master control system 254. Therefore, methods and systems consistent with certain embodiments of the present invention allow a user to shape the power curve associated with drive train system 252 based on predetermined specifications. For example, a customer may request that work machine 200 operates at higher power levels when the machine is traveling at greater ground speeds. Such specification may require the user to program memory 314 with a performance map that includes a drive train power curve that slopes upward proportional to the machine's ground speed.

The embodiments, features, aspects, and principles of the present invention may be implemented in various environments and are not limited to work site environments. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for controlling power provided by a drive train system of a mobile machine, which includes an engine that provides power to a generator that, in turn, provides power to a motor, the motor providing power to a travel mechanism that enables the mobile machine to travel across a terrain surface, the method comprising:
   determining the ground speed of the mobile machine;
   adjusting operation of the motor based on the determined ground speed;
   adjusting operation of the generator based on the adjusted operation of the motor; and
   adjusting operation of the engine such that the engine produces an amount of engine power that meets a load demand corresponding to the adjusted operation of the generator.

2. The method of claim 1, wherein adjusting operation of the motor includes:
   accessing a performance map stored in a control system;
   determining a first level of power the motor is to produce based on the information in the performance map; and
   adjusting operation of the motor such that the motor produces the first level of power based on the determined ground speed.

3. The method of claim 2, wherein adjusting operation of the generator includes:
   adjusting the operation of the generator in a manner consistent with a predetermined power curve reflected in the performance map in order to provide sufficient power to allow the motor to produce the first level of power.

4. The method of claim 3, wherein the predetermined power curve is related to the determined ground speed.

5. The method of claim 2, wherein the motor is configured to operate at a second level of power when the mobile machine is traveling above a second ground speed, and wherein determining the first level of power the motor is to produce includes:

determining that the ground speed of the mobile machine is below the second ground speed;

producing a motor control signal that instructs the motor to produce the first level of power, wherein the first level of power is below the second level of power.

6. The method of claim 5, wherein the motor is configured to produce a maximum level of power when the mobile machine travels at a ground speed within a predetermined range of ground speeds including the second ground speed.

7. The method of claim 6, wherein the second level of power is the maximum level of power the motor is configured to produce.

8. The method of claim 1, further including:

creating a performance map that includes information reflecting a relationship between engine power produced by the engine and drive train power produced by the motor as a function of ground speed of the mobile machine.

9. The method of claim 8, wherein the generator and motor make up a drive train of the mobile machine and wherein creating the performance map includes:

determining one or more specifications associated with the mobile machine;

shaping a motor power curve associated with the operation of the motor based on the one or more specifications, wherein the motor power curve represents a relationship between the power produced by the motor as a function of ground speed of the mobile machine;

determining a drive train power curve associated with an expected operation of the drive train, wherein the drive train power curve follows a performance path corresponding to that of the motor power curve at lower power levels; and storing information reflecting the motor power curve and the drive train power curve in the performance map.

10. The method of claim 8, wherein power provided to the drive train by the engine is at a power level that is reflected in the drive train power curve.

11. The method of claim 2, wherein adjusting the operation of the generator includes adjusting operation of the engine based on the first level of power produced by the motor.

12. A system for controlling ground power provided by a mobile machine, comprising:

a drive train system including a generator for receiving engine power from an engine and a motor for producing ground power to a travel mechanism that allows the mobile machine to travel across a terrain surface; and a motor control system, included in the drive train system, for receiving speed data reflecting a ground speed of the mobile machine and for generating a motor control signal based on the ground speed, wherein the motor provides the ground power based on the motor control signal and the motor control system uses a parameter map having information reflecting one or more relationships between engine power, ground power, and ground speed to generate the motor control signal, and wherein the engine adjusts its engine power based on the ground power produced by the motor.

13. The system of claim 12, wherein the engine adjusts its power based on a load demanded by the drive train system when providing the ground power.

14. The system of claim 12, wherein the motor control system is configured to:

determine a first level of power the motor is to produce based on the information in a performance map; and generate the motor control signal for adjusting operation of the motor such that the motor produces a first level of ground power based on the determined ground speed.

15. The system of claim 14, wherein the generator adjusts its operations based on the first level of power produced by the motor and the engine adjust the level of engine power in response to the adjusted generator operations.

16. The system of claim 12, wherein the motor is configured to operate at a first level of ground power when the mobile machine is traveling above a first ground speed, and the motor control system is configured to:

determine that the ground speed of the mobile machine is below the first ground speed; and produce a motor control signal that instructs the motor to produce ground power that is below the first level of ground power.

17. The system of claim 16, wherein the engine is configured to operate at a first level of engine power when the motor operates at the first level of ground power, and the engine reduces its engine power to a level below the first level of engine power when the motor produces ground power below the first level of ground power.

18. The system of claim 17, wherein the first level of engine power is equal to the maximum level of engine power the engine is configured to produce.

19. The system of claim 13, wherein the motor control system includes a performance map that includes a motor power curve associated with the operation of the motor, the power curve representing a relationship between the power produced by the motor as a function of ground speed of the mobile machine.

20. The system of claim 19, wherein the performance map further includes a drive train power curve associated with a power demand for the generator that follows a performance path similar to that of the motor power curve at various mobile machine speeds.

21. The system of claim 20, wherein the performance map further includes an engine power curve associated with the engine power produced by the engine that follows a performance path similar to that of the motor power curve at various mobile machine speeds.

22. The system of claim 12, wherein the engine produces a first level of engine power when the motor produces a first level of ground power and wherein the engine independently produces a different level of engine power when the engine receives a load demand from an auxiliary load mechanism operating in the mobile machine while the motor is producing the first level of ground power.

23. The system of claim 12, wherein the generator and engine adjust their operations based on the ground power produced by the motor.

24. The system of claim 12, wherein the motor control system generates the motor control signal based on a user request to adjust the ground speed of the mobile machine.

25. The system of claim 24, wherein the user request is provided to a master control system associated with the drive train system and the master control system provides a master control signal to the motor control system directing the motor control system to adjust the ground power produced by the motor based on the user request.

26. The system of claim 12, wherein the motor control system includes a performance map that is programmed with motor power curve data that allows the motor control system to control the amount of ground power produced by the motor based on the ground speed of the mobile machine.

27. The system of claim 26, wherein the performance map includes engine power curve data reflecting anticipated operations of the engine based on the motor power curve data.

28. A computer-readable medium including instructions for performing a method, when executed by a processor, for controlling power provided by a drive train of a mobile machine including a generator receiving engine power from an engine and a motor receiving generator power from the generator and producing ground power to a travel mechanism that allows the mobile machine to travel across a terrain surface at a certain ground speed, the method comprising:
  receiving a user request to adjust the ground speed of the mobile machine;
  analyzing power curve information stored in a memory device that indicates an amount of ground power the motor should produce to cause the mobile machine to travel at the requested ground speed; and
  generating a motor control signal based on the power curve information,
  wherein the motor control signal adjusts the ground power provided by the motor to the travel mechanism and the generator adjusts the amount of generator power provided to the motor based on the adjusted ground power, and wherein the engine independently adjusts the amount of engine power provided for the mobile machine based on a load demand produced by the generator when adjusting the generator power.

29. A system for controlling power provided in a mobile machine including a drive train that transfers engine power from an engine to ground power for a travel mechanism that allows the mobile machine to travel across a terrain surface at a certain ground speed, the system comprising:
  means for determining the ground speed of the mobile machine;
  means for adjusting the ground power produced by the drive train based on the determined ground speed; and
  means for adjusting engine power produced by the engine based on the adjusted operation of the drive train such that the engine produces levels of engine power to the drive train that are proportional to the ground power produced by the drive train at respective ground speeds of the mobile machine.

30. A method for controlling power provided by a drive train of a mobile machine including an engine and a motor that transfers ground power to a travel mechanism that enables the mobile machine to travel across a terrain surface, the method comprising:
  determining a current ground speed of the mobile machine;
  adjusting an amount of ground power produced by the motor based on the current ground speed using a performance map including predefined performance curves reflecting a relationship of power and ground speeds of the mobile machine; and
  adjusting an amount of engine power produced by the engine based on the adjusted amount of ground power produced by the motor such that the level of engine power produced by the engine at different ground speeds is proportional to the ground power produced by the motor.

31. A method for controlling power provided to a drive train of a mobile machine including an engine and a drive train that transfers power to a travel mechanism that enables the mobile machine to travel across a terrain surface, the method comprising:
  determining the ground speed of the mobile machine;
  adjusting operation of the engine based on the determined ground speed; and
  adjusting operation of the drive train based on the adjusted operation of the engine such that the drive train, using a motor, produces predetermined ground power as a function of the determined ground speed.

32. A system for controlling ground power provided by a mobile machine, comprising:
  an engine control system for receiving speed data reflecting a ground speed of the mobile machine and for generating an engine control signal based on the ground speed;
  an engine for providing engine power based on the engine control signal; and
  a drive train system including a motor, the drive train system for receiving the engine power from the engine and producing ground power to a travel mechanism that allows the mobile machine to travel across a terrain surface,
  wherein the engine control system uses a parameter map having information reflecting one or more relationships between engine power, ground power, and ground speed, to generate the engine control signal.

33. A computer-readable medium including instructions for performing a method, when executed by a processor, for controlling power provided to a drive train of a mobile machine including an engine that provides engine power to a drive train that provides ground power to a travel mechanism that allows the mobile machine to travel across a terrain surface, the method comprising:
  determining the ground speed of the mobile machine;
  analyzing power curve information stored in a memory device that indicates an amount of engine power the engine should produce based on the determined ground speed of the mobile machine; and
  generating an engine control signal based on the power curve information,
  wherein the engine control signal adjusts the operation of the engine, which causes the drive train to adjust the ground power provided to the travel mechanism.

* * * * *